Nov. 19, 1940.    G. HUNT    2,222,508
CLUTCH
Filed July 3, 1939

Inventor
George Hunt
By
Blackmore, Spencer & Hunt
Attorneys

Patented Nov. 19, 1940

2,222,508

UNITED STATES PATENT OFFICE 2,222,508

CLUTCH

George Hunt, Dayton, Ohio, assignor to General Motors Corporation, Detroit, Mich., a corporation of Delaware Application July 3, 1939, Serial No. 282,723

5 Claims. (Cl. 192—68)

This invention relates to clutches and is the result of an effort to improve the clutch by which the engine shaft of a motor vehicle is releasably coupled to the input shaft of the change speed mechanism.

An object of the invention is to improve the operating connection betwen the clutch engaging spring and the throwout collar.

Other objects including economy and simplicity will be understood from the description which follows.

On the drawing:

Figure 1 is a transverse section, the section being indicated by the line 1—1 of Figure 2.

Figure 2 is a view in elevation partly broken away and in section.

Figure 3 shows in perspective two parts in disassembled relation.

Figure 4 is a section on line 4—4 of Figure 2.

Referring to the drawing, the engine shaft 5 is connected to the flywheel 7 by fastening means 9. Fastening means 11 serve to secure a cover 13 to the flywheel. The input shaft of the transmission is marked 15. It extends into the cover enclosure and is piloted within the end of the engine shaft as at 17. Slidably but non-rotatably mounted on shaft 15 is a hub 19. A driven disc 21 provided with friction facings 23 is operably connected to the hub by torque transmitting springs 25. A pressure plate 27 is used to grip the driven plate between itself and the flywheel. It is formed with a plurality of radial extensions 29 which are received in slots 31 formed in the cover whereby the pressure plate rotates jointly with the cover.

To normally resiliently force the pressure plate into active clutch engaging position, there is used a coned spring 33. The spring has a circular line contact with the pressure plate at 35. To take the reaction of the spring the cover carries a circular series of rivets 37. Between the heads 38 of the rivets and the cover are two rings 39 and 41 supported by the rivets. The spring 33 has a circular series of apertures 43 and the rivets pass through some of these apertures, the rings 39 and 41 being on opposite sides of the spring as shown. From apertures 43 there extend radial slots 45 whereby the inner part of the spring is divided into a series of fingers 47.

A collar 49 is formed as a forging. It is provided with a face 51 ground flat to engage any preferred form of throwout member such, for example, as a carbon block. The opposite side of the collar 49 has a rounded surface 53 to engage the tongues 47. Constant contact is to be maintained between the fingers 47 and the surface 53. To this end, resilient rods 55 are used. Each rod has one end bent at a right angle to its axis as at 57 and the coned spring is formed with openings to receive these ends. The other end of each spring rod has a partispherical surface 59. The collar is formed with radial passages 61 within which these ends 59 are slidably received. Specially formed pins are seen at 63. One is used for each spring rod 55. The pins are extended through openings in the spring radially nearer the center than the openings for the ends 57. The pins are then headed to permanently secure them to the spring. The opposite ends of the pins are bifurcated to form slots 65 which receive the mid-portions of the spring rods. The furcations are then bent over the rods to permanently secure the parts together. The spring rods are stressed in the process of assembly so that the fingers 47 are held resiliently in contact with the surfaces 53 of the collar.

In operation the coned spring 33 pushes the pressure plate resiliently toward the flywheel and the driven plate is gripped therebetween. The reaction of the spring load is taken by the ring 41 resting on the cover and supported by the rivets 37. To release the clutch, pressure is applied to the collar 49 so that it moves toward the flywheel. The collar takes the load from ring 41 and fulcrums the spring about ring 39. In so doing the outer margin of the coned spring is moved away from the flywheel and any convenient means such as 67 may be used to release the driven plate. The spring rods 55 afford an inexpensive and convenient means to complete a subassembly of spring and collar so that the fingers 47 at all times yieldingly engage the collar. The position of the contact between the fingers 47 and the collar at 53 and the position of the engagement of the spring rods with the collar are such that distortion and stress of the spring rods is minimized as the coned spring changes its shape during the movement between clutch engaging and clutch releasing positions. The spring rods serve also to effect a driving engagement between the spring and the collar.

I claim:

1. In a friction clutch, a coned spring and throwout collar assembly, said assembly including radially extending resilient rods one end of each rod being anchored to said coned spring and having at its other end a radially sliding connection with said collar.

2. In a friction clutch, a coned spring and a throwout collar, radially extending spring rods each rod having one end slidable relative to said collar and anchored at its other end to said spring and stressed in assembly to maintain contact between said collar and coned spring and to transmit the rotary movement of the spring to the collar.

3. In a clutch, a coned spring, a throwout collar, radially extending spring rods, each rod terminally connected to said coned spring and collar and having an intermediate connection to said coned spring whereby it is stressed to effect a permanent contact between said collar and coned spring.

4. The invention defined by claim 3, the engagement of the spring rods and the collar being at a radial distance substantially equal to the radial distance of the contact region between the collar and the coned spring.

5. The invention defined by claim 3, the connection of each spring rod with the coned spring comprising an angular end received within an aperture of the coned spring, and the other end of the spring rod having a rounded surface movable in a radial passage of the collar.

GEORGE HUNT.